United States Patent [19]

Smith

[11] Patent Number: 5,645,231
[45] Date of Patent: Jul. 8, 1997

[54] GLASS CHOPPERS

[75] Inventor: John Smith, Burnsville, Minn.

[73] Assignee: Xerxes Corporation, Minneapolis, Minn.

[21] Appl. No.: 516,532

[22] Filed: Aug. 18, 1995

[51] Int. Cl.⁶ .................................................. B02C 25/00
[52] U.S. Cl. ...................... 241/36; 239/DIG. 8; 241/37.5
[58] Field of Search ........................................ 439/207, 911; 241/DIG. 30, 101.2, 36, 37.5, 235, 301; 239/DIG. 8

[56] References Cited

U.S. PATENT DOCUMENTS

| | | | |
|---|---|---|---|
| 2,934,116 | 4/1960 | Dannenmann | 341/37.5 |
| 3,074,648 | 1/1963 | Stone | 241/301 X |
| 4,632,319 | 12/1986 | Schlund et al. | 241/37.5 |
| 5,035,366 | 7/1991 | Hashimoto et al. | 241/37.5 |
| 5,064,120 | 11/1991 | Luttrell | 239/DIG. 8 X |
| 5,221,052 | 6/1993 | Vega | 241/37.5 X |

*Primary Examiner*—Mark Rosenbaum
*Attorney, Agent, or Firm*—Oblon, Spivak, McClelland, Maier & Neustadt, P.C.

[57] ABSTRACT

The power supply to the motor of a glass chopper is rerouted so that the motor cannot be operated unless the cover enclosing the cutter blades is in place. The stud which normally supports the cover is replaced with a conduit which has an axial passage from end to end. A fitting attaches the cover to the conduit to hold the cover in position over the cutting blades. The fitting is adapted to secure a power supply line to said cover. Thus, the motor can only be actuated when the cover is in position enclosing the cutting means at which time the power supply line is in communication with the motor through the conduit. When the cover is removed from its protective position, the power supply line actuating the motor is disconnected and the glass chopper can be safely serviced.

16 Claims, 5 Drawing Sheets

GLASS CHOPPERS

FIELD OF THE INVENTION

This invention pertains to glass "choppers" or guns which may be used, for example, to break continuous glass rovings into discrete glass fiber lengths, the lengths being discharged from the chopper or gun at high velocity in a fluid jet stream. The choppers are also useful for cutting mats or panels in which case the cut product is not ejected by the fluid jet stream. Specifically, a new structure is provided to make use and maintenance of the choppers simultaneously easier and safer.

BACKGROUND OF THE PRIOR ART

Glass choppers use fluid or electric powered blade rotors to break continuous glass rovings into individual short glass fiber lengths. These choppers use a hard rubber back up roll as an anvil which cooperates with a rotor carrying one or more transversely extending blades. The back up roll and rotor cooperate to chop a discrete glass fiber length off the continuous roving each time a rotor blade contacts the back up roll.

OSHA Standard 1910.212 provides in pertinent part:

(1) One or more methods of machine guarding shall be provided to protect the operator and other employees in the machine area from hazards such as those created by point of operation, ingoing nip points, rotating parts, flying chips and sparks. Glass choppers typically satisfy this requirement with a cover that encloses the bladed rotor and back up roll. The cover also includes a discharge chute which directs chopped glass fibers away from the operator. Typically, the cover is held in place on a stud extending from the chopper body by a nut captive to the cover. This nut often is difficult to turn, and inspection of equipment usually shows damage from pliers used to turn the nut. Ordinarily, the stud used to, fasten the cover to the chopper body also supplies auxiliary purge fluid for the chopper.

OSHA Standard 1910.147 relates to control of hazardous energy during servicing or maintenance of machines such as glass choppers. This regulation has been interpreted to be intended to provide the same measure of protection for the operator while servicing, maintaining and adjusting the equipment as the machine guarding regulations provide. During operation of a glass chopper, it is frequently necessary to clean and adjust the chopper. When this is done the operator is required to go the primary source of the energy powering the chopper, shut the energy off, bleed any stored excess energy and affix a lock for which only he or she has the key that prevents restoring the power to the chopper until the lock is removed.

Standard 1910.147, Section (a)(2) (iii) states:

This standard does not apply to (a) work on cord and plug connected electrical equipment for which exposure to the hazards of unexpected energization of start up of the equipment is controlled by the unplugging of the equipment from the energy source and by the plug being under the exclusive control of the employee performing the servicing or maintenance.

This regulation has been interpreted as excluding similar fluid powered equipment provided the energy stored is bled and the plug is removed. In order for the energy stored to be bled when the plug is removed, there must be no valves between the unplugged fitting and the motor.

Typical glass choppers have no easily accessible fitting which allow this unplugging. Further, servicing of the chopper can be done without unplugging the power source. Thus, it is easy for the operator to circumvent the protection provided by the cover.

SUMMARY OF THE INVENTION

A first embodiment of the present invention comprises a fluid powered chopper motor wherein, the fluid distribution to the motor is modified compared to prior practice. The motor driving fluid is delivered through a quick disconnect fitting which is integrally connected to the cover for enclosing the chopper rotor and backing roll. The fluid is routed through the quick disconnect fitting and a hollow stud (conduit) to the motor when the quick disconnect fitting is attached to the stud (conduit). In its attached position, the quick disconnect fitting maintains the chopper cover in position on the stud (conduit) over the chopper rotor and backing roll. Since the stud (conduit) has no valves, the stored energy is vented from the chopper motor when the quick disconnect fitting is removed from the end of the stud.

In a second embodiment of the present invention comprising an electric chopper motor, electrical power to the chopper motor is provided through an electrical cord which has one portion of an electrical connector detachably secured to a cover for enclosing the chopper rotor and backing roll. That portion of the electrical connector is adapted to cooperate with a mating electrical connector which is suitably secured to the chopper body member for example by a stiff conduit. When the two portions of the electrical connector are engaged, they maintain the chopper cover in position over the chopper rotor and backing roll.

OBJECTS OF THE INVENTION

It is an object of the invention to provide a cover which is easily removed and attached to a glass chopper by means of a quick disconnect fitting.

It is an object of the invention to provide a positive connection of the cover to the glass chopper and to immediately vent any stored energy upon disconnection of the cover from the glass chopper.

It is an object of the invention to integrally connect the cover to the disconnect fitting so that the cover must be in place to operate the machine.

It is an object of the invention to have the cover integrally connected to a fluid or electrical source fitting so that the cover can only be detached from the chopper by also simultaneously disconnecting the fluid or electrical source fitting and therefore no power is available to injure an employee during servicing of the chopper.

MORE DETAILED DESCRIPTION

Figure 1:
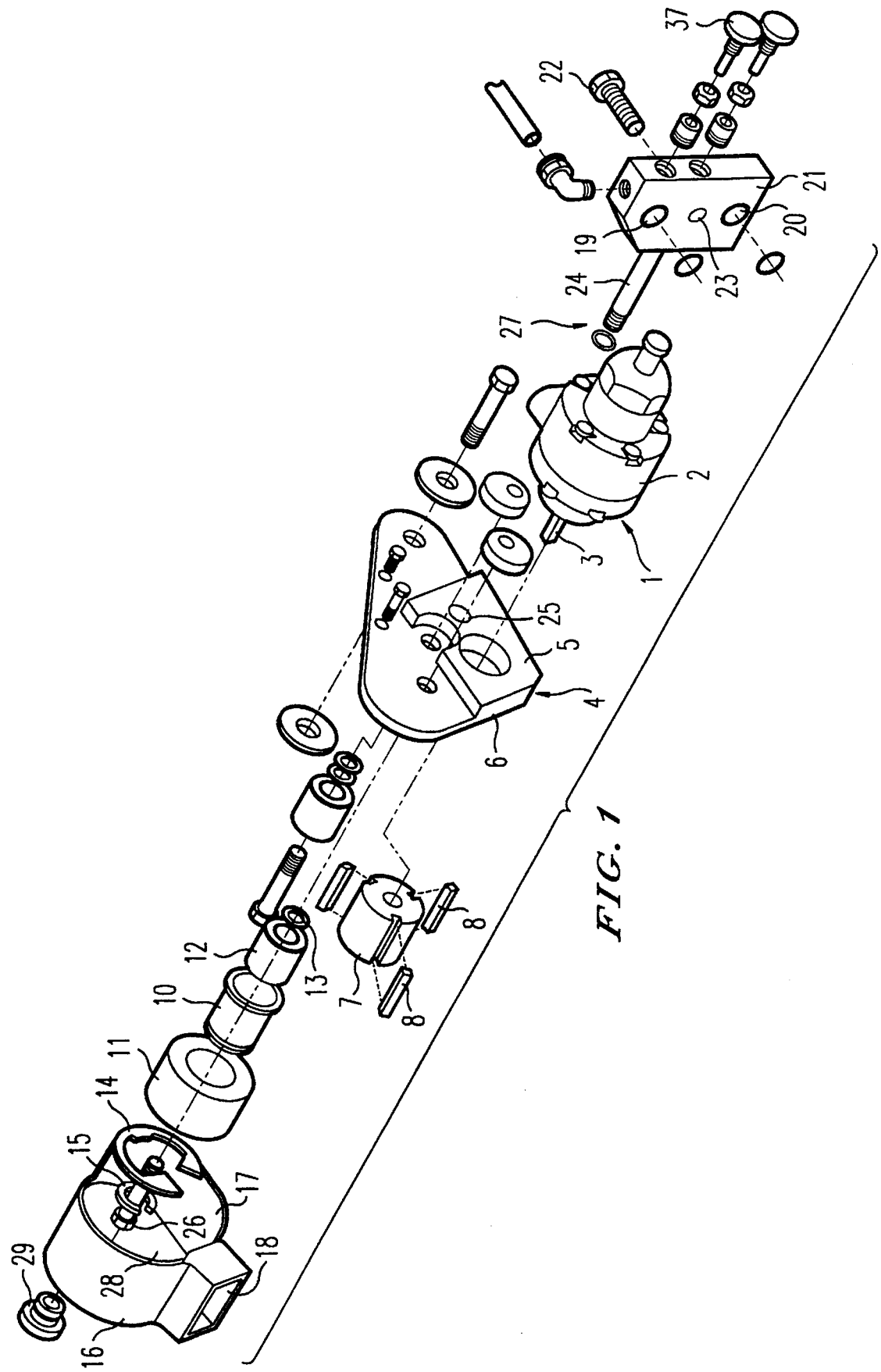
FIG. 1 is an exploded view of a glass chopper which has not been modified by the present invention.

The glass chopper illustrated in FIG. 1 includes a fluid powered motor (1) comprising an outer casing (2) with a driveshaft (3) extending from one end thereof. The motor is secured to a chopper base member (4) such that the outer casing (2) is located on a first side (5) of the base member (4) with the driveshaft (3) extending through the base member (4) and beyond the second side (6) thereof. A blade rotor (7), which is adapted to hold one or more blades (8), is removably secured to the driveshaft (3).

A countershaft (9) extends from the second side (6) of the base member (4) along a line substantially parallel to the driveshaft (3). A hard rubber roll (10) is mounted on a roll mandrel (11) which in turn is mounted on a bearing (12) and the thus formed assembly is rotatably mounted on the countershaft (9) and spaced from the second side (6) of the base member (4) by a washer (13). An E-ring (14) maintains the hard rubber roll (10) in proper axial position on the countershaft (9) such that the hard rubber roll (10) cooperates with the cutting blade or blades. (8) on the blade rotor (74 to chop continuous glass rovings that are fed between the blade rotor (7) and the hard rubber roll (10) into discrete glass fiber lengths. The hard rubber roll (10) serves as an anvil against which the blade or blades (8) bear while chopping the rovings. The lock ring (15) holds the cover nut (29) on the cover.

A cover (16) is adapted to enclose the blade rotor (7) and hard rubber roll (10). The cover (16) has a first opening (17) along one side for receiving the blade rotor (7) and hard rubber roll (10). The cover has a second opening (discharge chute) (18) through which the cut material is discharged. When the cover is in position covering the blade rotor (7) and the hard rubber roll (10), the second side of the base member (4) closes the first opening (17) in the cover (16).

The outer casing (2) of the motor (1) has a fluid inlet (not shown) and a fluid outlet (not shown) which cooperate respectively with an outlet passage (19) and an inlet passage (20) in a fluid distribution block (21). The fluid distribution block (21) is attached to the outer casing (2) of the motor (1) by a cap screw (22) which passes through an aperture (23) in the distribution block (21) and into a threaded opening (not shown) in the outer casing (2). The distribution block (21) has a stud (24) extending from one side thereof. The stud (24) passes through an aperture (25) in the base member (4) (See FIG. 2) and through an aperture (26) in the cover (16). In the prior art glass chopper shown in FIG. 2, the stud (24) is closed at the outer or remote end (27). The cover (16) is mounted on the stud (24) with the inner side (28) thereof, which has the first opening therein, bearing against the second side (6) of the base member (4) and is held in position by a cover nut (29) threaded on the outer or remote end (27) of the stud (24).

Figure 2:
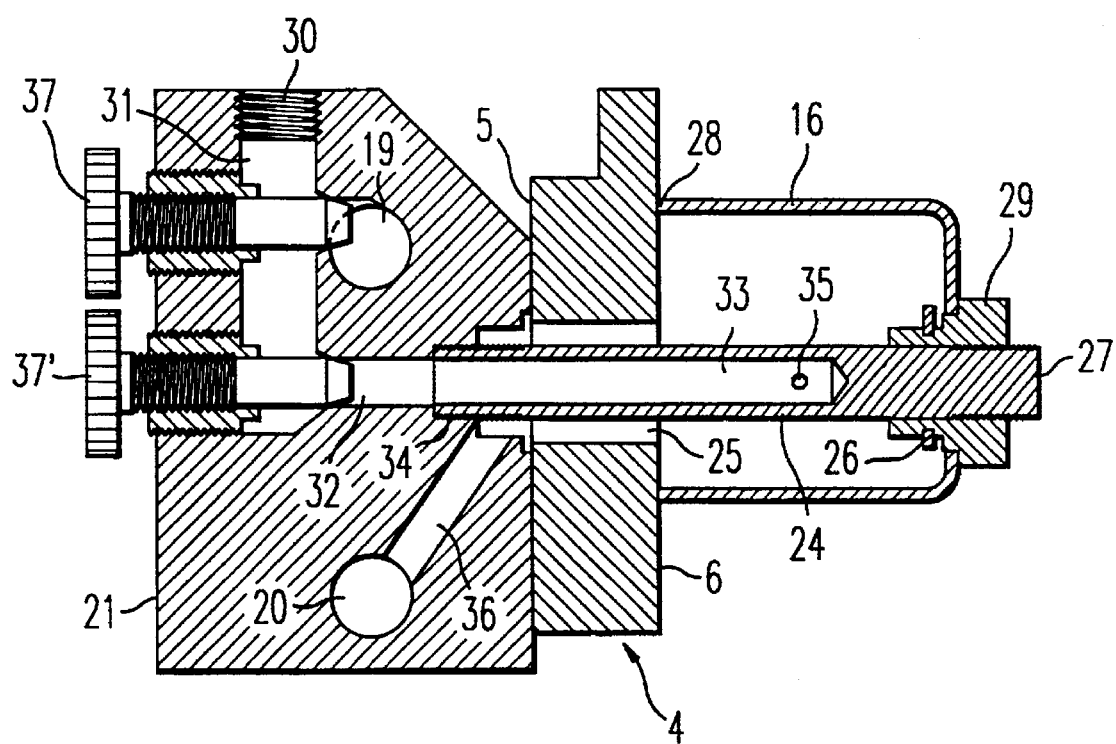
FIG. 2 is a cross-sectional view of an assembled glass chopper of the type shown in FIG. 1 with some of the elements omitted for clarity.

As shown in FIG. 2, the distribution block (21) has a fluid inlet (30) at the top, a distribution chamber (31) which communicates with the outlet passage (19) and a passage (32) leading into a hollowed out portion (33) of the stud (24). The hollowed out portion (33) of the stud (24) extends from the end (34) thereof secured to the distribution block (21) to a point beyond the second side (6) of the base member. A small opening (35) extends radially through the stud (24) into the hollowed out portion (33) allowing fluid in the distribution chamber (31) to be purged outwardly through the stud (24).

As noted above, the distribution block (21) includes an inlet passage (20) cooperating with an outlet (not shown) on the outer casing (2). The inlet passage (20) in the distribution block (21) communicates with a vent passage (36) which allows the fluid returning from the motor to be vented along the axis of the stud (24) through the aperture (25) in the base member (4) and outward through the discharge opening (18) in the cover (16).

A first stem (37) is mounted in the distribution block for controlling the amount of fluid entering the outlet passage (19) from the distribution chamber (31). A second stem (37') is mounted in the distribution block (21) for controlling the flow of fluid from the distribution chamber (31) into the hollowed out portion (34) of the stud (24). The second stem (37') can be opened to purge air from the inlet line and distribution chamber (31) when fluid communication from the source of fluid pressure to the inlet line is shut off.

Figure 3:
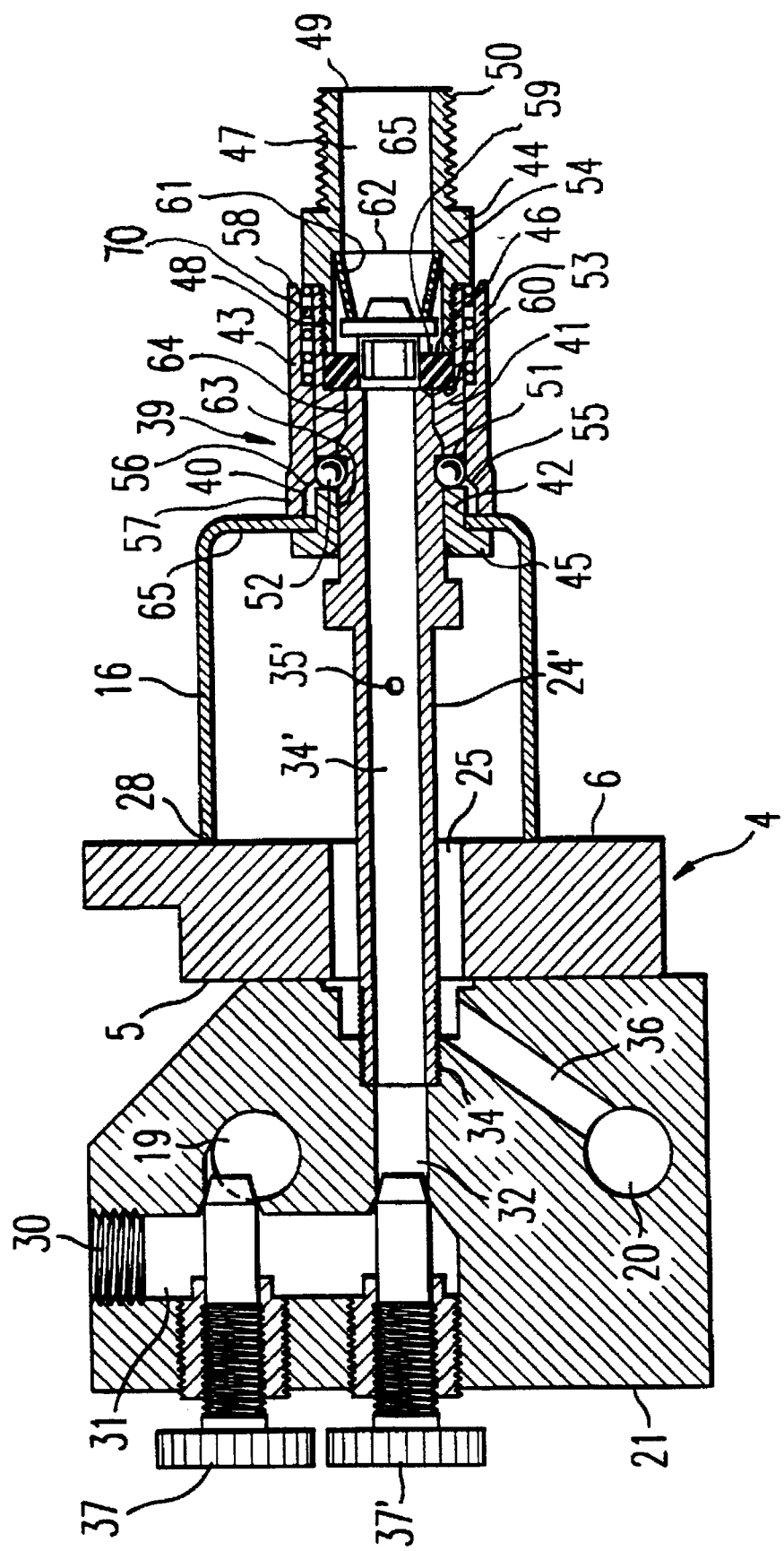
FIG. 3 is a cross-sectional view similar to FIG. 2 which illustrates a first embodiment of the safety improvement of the invention described herein.

In the improvement shown in FIG. 3, the fluid inlet (30) into the distribution block (21) is closed with a plug (38), the stud (24) is replaced with a conduit (24') that has an axial passageway (34') extending completely therethrough from end to end, and the cover nut (29) for holding the cover (16) on the stud (24) is replaced with a fitting (39) detachably connected to a first wall of the cover (16) and adapted to be detachably connected to the conduit (24'). The conduit (24') also has a small opening (35') for purging air from the distribution chamber (31).

In the preferred embodiment illustrated in FIG. 3, the connection between the fitting (39) and the conduit (24') is of the quick disconnect type. The conduit (24') has a notch or recess (40), which may be a circumferential groove, adjacent the end (41) remote from the end connected to the distribution block (21). The fitting (39) is comprised of several elements including an inner sleeve (42), an outer sleeve (43) and a tubular extension (44) adapted to be connected to a supply hose.

The inner sleeve (42) is provided at one end with a radially outwardly directed flange (45) and at the other end with an internally threaded portion (46). The tubular extension (44) has an axial passage (47) extending therethrough from end to end, has an externally threaded portion (48) at one end adapted to cooperate with the internally threaded portion (46) of the inner sleeve. Of course, the inner sleeve could be externally threaded and the tubular extension internally threaded if desired.

The other end (49) of the extension member may have a threaded portion (50) or other suitable fastening means adapted to connect the fitting (39) with a fluid supply hose.

The inner sleeve (42) has radial openings (51) therein which are in alignment with the recess or groove (40) in conduit (24') when the cover (16) is properly located on the conduit (24') so that the second side (6) of the base member (4) closes the first opening (17) in the cover (16). The radial openings (51) in the inner sleeve (42) are tapered so that they are slightly smaller adjacent the inner surface of the sleeve than they are adjacent the outer surface thereof. Each radial opening (51) receives a ball or radially movable element (52) which is of such size that it can pass partially through the radial opening but not completely therethrough.

The radially movable element is sized to move inwardly through the radial opening to a point where a portion of the radially movable element extends inwardly beyond the inner diameter of the inner sleeve at the location on the inner sleeve bearing the radial openings.

The outer sleeve (43) is axially movably mounted on an inner sleeve (42). The outer sleeve (43) has a first abutment or internal shoulder (53) thereon facing a second abutment or external shoulder (54) on the tubular extension (44). A resilient member or spring (70) is inserted between the two abutments and biases the outer sleeve into a position engaging the inner surface of the first wall (65) of the cover (16) where the inner surface of a first section (56) of the outer sleeve (43) forces the radially movable elements (52) into their radially inward position. In the radially inward position, a portion of each radially movable element extends inwardly past the inner surface of the inner sleeve into the notch or groove (40) in the conduit (24'). The first section (56) of the outer sleeve precludes the radially movable element from moving outwardly and thereby maintains the fitting (39) in engagement with the conduit (24').

As shown in FIG. 3, the outer sleeve comprises first (56), second (57) and third (58) sections. The outer sleeve is normally spring biased toward the cover (16) such that the second section (57) is located beyond the radially extending ball receiving openings in the inner sleeve. The inner surface of the second section is stepped radially outwardly with respect to the inner surface of the first section so that when the outer sleeve is manually moved against the bias of the spring (to the right in FIG. 3), the radially movable elements (52) are permitted to move radially outwardly out of the groove (40) in the conduit (24') into the space between the inner surface of the second section (57) of the outer sleeve (43) and the outer surface of the inner sleeve and thereby permit the fitting (39) and integrally connected cover to be quickly removed from the conduit (24').

The fitting (39) is connected to the cover (16) by first inserting the inner sleeve (42) outwardly through the same aperture (26) in the cover through which the conduit (24') is adapted to pass so that the outwardly directed flange (45) engages the inside of the first wall (65) of the cover (16). The radially movable elements (52, 55) are then inserted in the radial openings (51) in the inner sleeve and the outer sleeve (43) is positioned over the inner sleeve (42). The spring (50) is then placed in position between the facing abutments on the outer sleeve and the tubular extension (44) is threaded onto the inner sleeve. The inner surface of the third section (58) of the outer sleeve is stepped radially outward with respect to the first section (56) to provide space for the spring between the inner surface of the third section and the outer surface of the inner sleeve.

A resilient sealing washer (59) is placed against an inwardly extending shoulder (60) on the inner sleeve for sealing the connection between the tubular extension (44), the conduit (24'), and the inner sleeve (42). The tubular extension has an outwardly extending shoulder (61) on the inner surface thereof adapted to retain a fluid filter (62) in the tubular extension between the outwardly directed shoulder and the sealing washer. An inwardly directed shoulder (63) on the inner sleeve (42) cooperates with an outwardly directed shoulder (64) on the conduit (24') to align the groove (40) with the radial openings (51) and place the remote end (65) of the conduit against the sealing washer (59) when the cover (16) and fitting (39) are attached to the conduit (24').

The arrangement illustrated in FIG. 3 has the advantage of requiring the fluid pressure for driving the motor to enter the distribution box through the fitting (39) and internal passage through the conduit (24') and precludes the possibility of an operator or service technician removing the cover enclosing the cutting blade or blades without first disconnecting the source of power to the motor and simultaneously purging the fluid from the distribution chamber (31).

Figure 4:
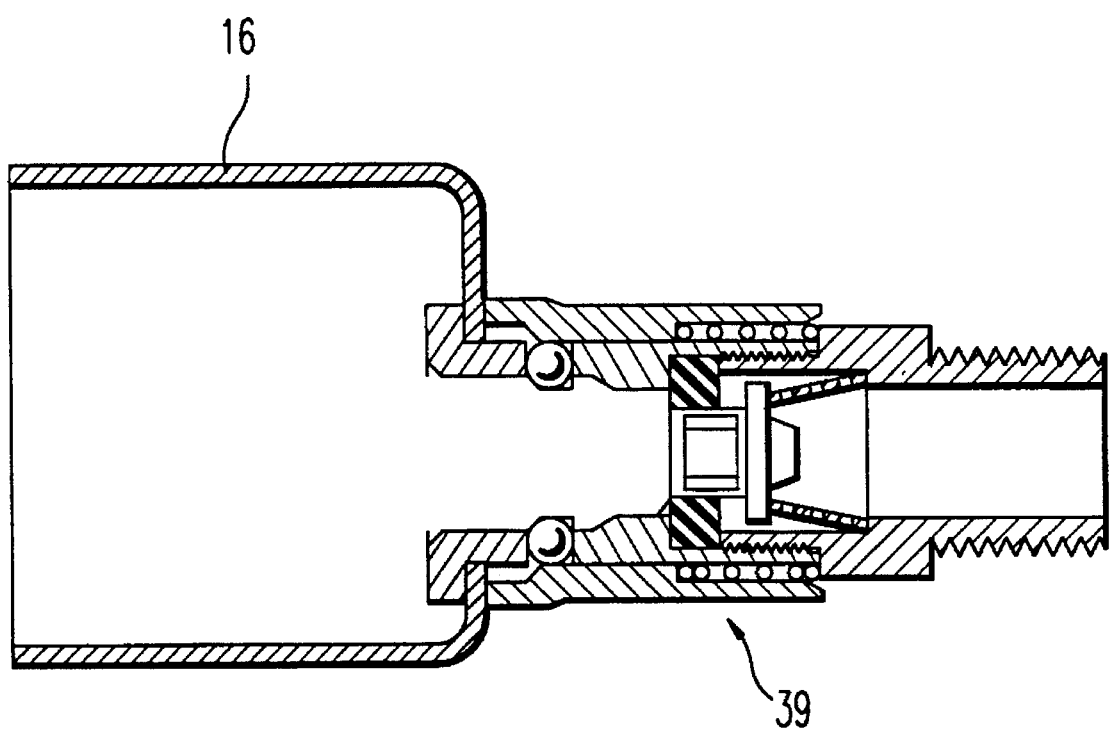
FIG. 4 is a cross-sectional view of a subassembly of some of the elements shown in FIG. 3.

The fitting (39) and cover (16) are illustrated in FIG. 4 disconnected from the conduit (24').

Figure 5:
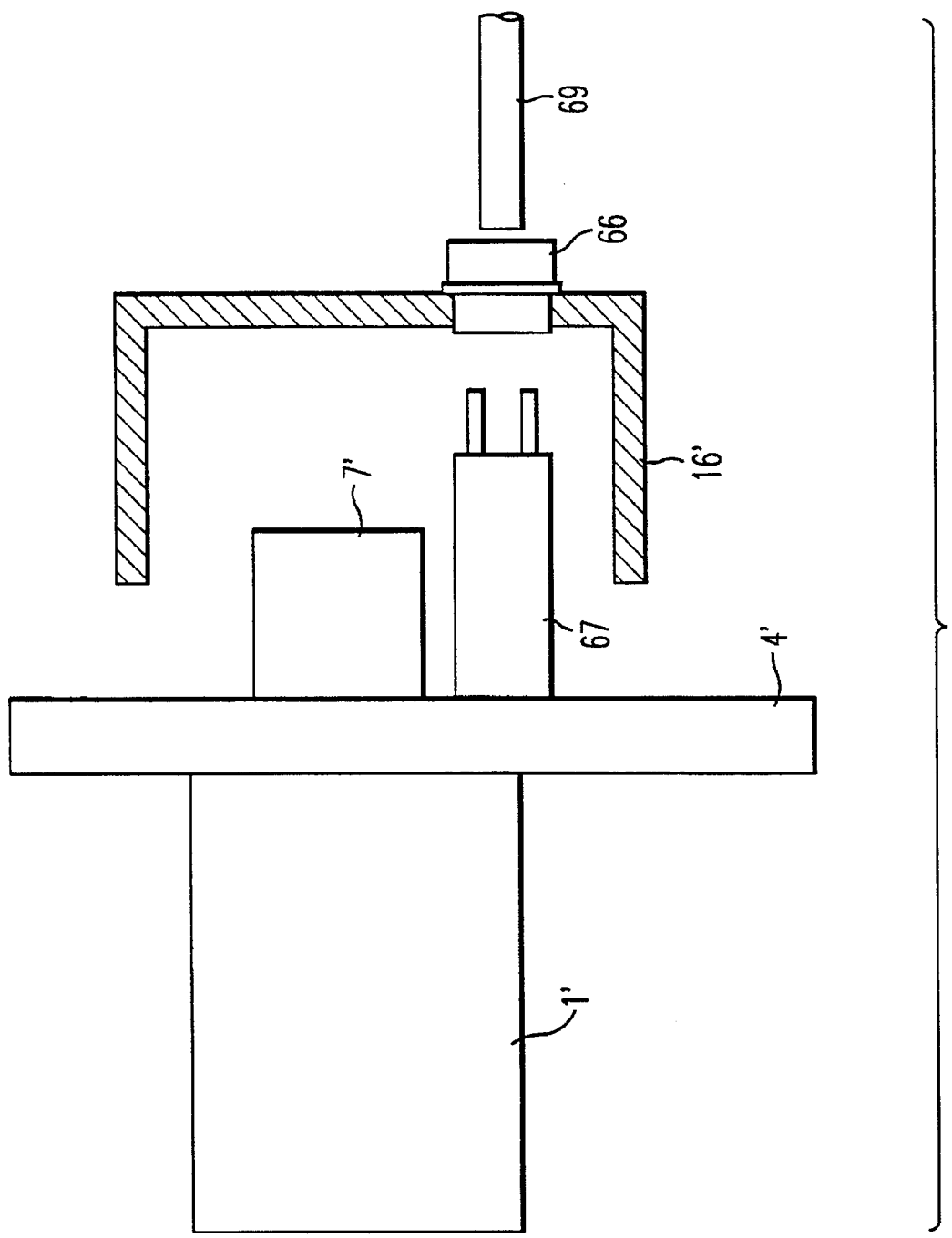
FIG. 5 illustrates a second embodiment of the safety improvement of the invention described herein.

The second embodiment of the invention, illustrated in FIG. 5, includes a female electrical connector (66) adapted to cooperate with a male electrical connector mounted on the rigid conduit (67) to not only complete an electrical connection to the chopper motor but also to secure the chopper cover (16') in position over the chopper rotor (7') and associated backing roll (not shown). When the male and female connectors are engaged, the inner edge (68) of the cover is in engagement with or positioned closely adjacent the base (4'). The electrical cord (69) or any other suitable portion of the electrical circuit may contain a separate rheostat or similar speed control device to control the speed of the electric chopper motor (1'). Of course, the male electrical connector could be attached to the cover of (16') with the female electrical connector incorporated in the rigid conduit (67).

The arrangement illustrated in FIG. 5 also precludes the possibility of an operator or service technician removing the cover to service the cutting blade or blades on the chopper rotor (7') without first disconnecting the source of electrical power to the motor (1').

The fluid supply line or electrical cord could be attached to the cover by a slip fitting, a hose barb, a hose clamp, threaded fittings, union fittings or other quick disconnect designs. It is therefor to be understood that within the scope of the appended claims, the invention may be practiced otherwise and as specifically described herein.

What is claimed as new and desired to be secured by Letters Parent of the United States is:

1. A chopper for chopping continuous glass roving into discrete fiber lengths, comprising::
   (a) a motor including a drive shaft extending from one end thereof;
   (b) a rotor mounted on said drive shaft for rotation therewith;
   (c) at least one blade mounted on the periphery of said rotor;
   (d) a backing roll mounted for cooperation with the blade or said rotor for chopping the glass roving;
   (d) a cover adapted to enclose said rotor and backing roll, said cover having an opening therein for discharging material cut by said blade;
   (e) a line for transmitting power to said motor;
   (f) a first connector portion attaching said line to said cover;
   (g) a second connector portion secured in fixed relationship to said motor adapted to cooperate with said first connector portion for releasably locking said cover in position enclosing said rotor and backing roll and simultaneously communicating power transmission from said line to said motor;
   (h) whereby power transmission to said motor is interrupted by removal of said cover from its position enclosing said rotor and backing roll.

2. A chopper according to claim 1, further comprising: said first connector portion including at least one radially movable element for releasably locking said first connector portion to said second connector portion.

3. A chopper according to claim 2, further comprising: said second connector portion comprising a conduit including a notch in the outer surface thereof adapted to cooperate with said at least one radially moveable element for releasably locking said first connector portion to said second connector portion.

4. A chopper according to claim 2, further comprising:
   (a) said first connector portion including an inner sleeve;
   (b) at least one radial opening in said inner sleeve;
   (c) said at least one radially moveable element arranged in said at least one radially opening for outward movement from a radially inward locking position in which a portion of said at least one radially moveable element projects inwardly of the inner diameter of the inner sleeve;

(d) said first connector portion further including an outer sleeve mounted over said inner sleeve and axially moveable from a first position over said at least one radial opening in said inner sleeve where it maintains said at least one radially movable element in an inward locking position and moveable to a second axial position where said at least one radially moveable element is free to move outwardly to an unlocked position.

5. A chopper according to claim 4, further comprising:
(a) said second connector portion comprising a conduit including a notch in the outer surface thereof;
(b) said conduit being sized to closely axially slide within said inner sleeve so that said notch in said conduit may be aligned with said at least one radial opening;
(c) a first section of said outer sleeve maintaining said at least one radially movable element in said notch in said conduit when said notch is aligned with said at least one radial opening and said outer sleeve is in its first axial position thereby releasably locking said connecting means to said conduit.

6. A chopper according to claim 5, further comprising:
(a) said cover including a first wall having an aperture therethrough for receiving said inner sleeve;
(b) an outwardly directed flange on said inner sleeve adjacent a first end thereof having a larger diameter than said aperture;
(c) a second end of said inner sleeve extending outwardly through said aperture with said flange positioned on the inner side of said first wall of said cover; and
(d) retaining structure for maintaining said inner sleeve in said aperture.

7. A chopper according to claim 6, further comprising:
(a) said retaining structure including said outer sleeve;
(b) said outer sleeve having a larger outside diameter than said aperture in said cover and being positioned over said inner sleeve with a first end thereof adjacent the outer surface of said first wall of said cover;
(c) said retaining structure further including an element biasing said flange of said inner sleeve into engagement with the inner surface of said first wall of said cover and biasing the first end of said outer sleeve into engagement with the outer surface of said first wall of said cover thereby maintaining said inner sleeve in said aperture.

8. A chopper according to claim 7, further comprising:
(a) said first connector portion includes a tubular extension having first end and a second end;
(b) said retaining structure securing said first end of said tubular extension to said second end of said inner sleeve, said inner sleeve and said tubular extension forming a continuous passage;
(c) a first abutment on said outer sleeve;
(d) a second abutment on said tubular extension; and
(e) said element biasing said flange comprising a spring positioned between said first and second abutments.

9. A chopper according to claim 8, wherein said second abutment comprises a radially outwardly directed shoulder on said tubular extension.

10. A chopper according to claim 8, wherein said tubular extension further comprises means on said second end thereof for connection to said line for transmitting power to said motor.

11. A chopper according to claim 10, wherein said means for connecting the second end of said tubular extension to said line transmitting power comprises threads.

12. A chopper according to claim 8 wherein said retaining structure comprises threads on said inner sleeve and cooperating threads on a first end of said tubular extension.

13. A chopper according to claim 8, further comprising:
(a) said outer sleeve including a third section having a larger internal diameter than said first section;
(b) the outer surface of said inner sleeve and the inner surface of the third section of said outer sleeve defining a second recess;
(c) said spring being positioned in said second recess.

14. A chopper according to claim 13 wherein the transition between the inner diameter of said first section of said outer sleeve and the inner diameter of said third section of said outer sleeve defines said first abutment.

15. A chopper according to claim 4, further comprising:
(a) said outer sleeve including a second section having a larger internal diameter than said first section;
(b) the inner surface of said second section of said outer sleeve and the outer surface of said inner sleeve defining a first recess;
(c) said first recess being out of alignment with said at least one radially moveable element when said outer sleeve is in said first axial position so that said inner surface of said first section of the outer sleeve maintains said at least one radially moveable element in a radially inward locked position and when said outer sleeve is in its second axial position said first recess is in alignment with said at least one radially moveable element thereby permitting said at least one radially moveable element(s) to move outwardly to an unlocked position.

16. A fluid powered chopper, comprising:
(a) a fluid powered motor including an outer casing having a drive shaft extending therefrom;
(b) a base member having first and second sides;
(c) means securing said motor to said base member with said outer casing located on said first side thereof and with said drive shaft extending through said base member and beyond said second side;
(d) at least one cutting blade removably mounted on said drive shaft for rotation therewith;
(e) a countershaft extending from the second side of said base member substantially parallel to said drive shaft;
(f) a backing roll rotatably mounted on said countershaft for cooperation with said cutting blade;
(g) said cutting blade and said backing roll cooperating to cut the material being worked on;
(h) a cover adapted to enclose said cutting blade and said backing roll;
(i) said cover having a first opening therein along one side;
(j) said cover receiving said cutting blade and said backing roll therein through said first opening;
(k) said cover having a second opening therein permitting the cut material to be discharged therefrom;
(l) said base member closing the first opening in said cover when said cover is in position covering said cutting blade and said backing roll;
(m) said outer casing of said motor having a fluid inlet and a fluid outlet;
(n) said drive shaft adapted to be driven by fluid passing from said inlet to said outlet;

(o) a block secured to said outer casing, said block comprising a fluid receiving chamber, an outlet passage and an inlet passage;

(p) said fluid receiving chamber communicating with said outlet passage and said outlet passage communicating with said inlet in said outer casing;

(q) said inlet passage in said block communicating at one end with said outlet in said outer casing and at the other end exiting through said block to vent the fluid returning from said motor;

(r) a conduit having an axial passage extending therethrough from one end to the other;

(s) said conduit attached at one end to said block;

(u) a passageway in said block communicating with said fluid receiving chamber and the axial passage through said conduit;

(v) each of said base and said cover having apertures therethrough for the passage of said conduit, said conduit extending through the said aperture in said base and, when said cover is in position enclosing said cutting blade and said backing roll, through said aperture in said cover;

(w) means for conveying fluid under pressure;

(x) means extending through said aperture in said cover for connecting said conveying means to said cover;

(y) said means for connecting said conveying means to said cover including means for connecting said conveying means and said cover to said conduit near the end thereof remote from said block so that said conveying means delivers fluid under pressure to said motor for actuating said motor only when said cover is in position enclosing said cutting blade and said backing roll and with said first opening in said cover closed by engagement of said cover with the second side of said base member;

(z) whereby, when said connecting means is connected to said conduit, fluid for driving said drive shaft of said motor passes through said conveying means, said conduct and said block to said outer casing of said motor and, when said connecting means is disconnected from said conduit, the source of power to said motor is interrupted and the cover enclosing said cutting blade and said backing roll is removed so those elements may be safely serviced.

\* \* \* \* \*